(12) United States Patent
Hur et al.

(10) Patent No.: US 8,547,498 B2
(45) Date of Patent: Oct. 1, 2013

(54) BACKLIGHT UNIT AND LIQUID CRYSTAL DISPLAY HAVING THE SAME

(75) Inventors: Gil Tae Hur, Suwon-si (KR); Kun Ho Cho, Suwon-si (KR); Yong Hun Kwon, Anyang-si (KR); Kye Hoon Lee, Suwon-si (KR); Suk Ju Choi, Jeonju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 13/224,926

(22) Filed: Sep. 2, 2011

(65) Prior Publication Data

US 2012/0069263 A1     Mar. 22, 2012

(30) Foreign Application Priority Data

Sep. 20, 2010    (KR) ........................ 10-2010-0092592

(51) Int. Cl.
    *G02F 1/1335*     (2006.01)
    *G01D 11/28*     (2006.01)

(52) U.S. Cl.
    USPC ................... 349/61; 349/62; 349/65; 362/26

(58) Field of Classification Search
    USPC ................................ 349/61, 62, 65; 362/26
    See application file for complete search history.

(56) References Cited

U.S. PATENT DOCUMENTS

| | | | | |
|---|---|---|---|---|
| 7,068,331 B2* | 6/2006 | Kim | ................................ | 349/58 |
| 7,593,087 B2* | 9/2009 | Jang | .............................. | 349/150 |
| 7,701,530 B2* | 4/2010 | Lee | ................................. | 349/58 |
| 8,411,228 B2* | 4/2013 | Watanabe | ....................... | 349/62 |
| 2002/0135572 A1 | 9/2002 | Weindorf et al. | | |

FOREIGN PATENT DOCUMENTS

| | | |
|---|---|---|
| JP | 2006-154292 A | 6/2006 |
| JP | 2009-301805 A | 12/2009 |
| KR | 20-2008-0000328 U | 3/2008 |
| KR | 10-2008-0105897 A | 12/2008 |
| TW | 200813562 A | 3/2008 |

OTHER PUBLICATIONS

Communication issued on Dec. 22, 2011 by the European Patent Office in the counterpart European Patent Application No. 11181261.6.

XP-002665554, Thomson Scientific, Dec. 15, 2011, 1 page.

* cited by examiner

*Primary Examiner* — Mike Qi

(74) *Attorney, Agent, or Firm* — Sughrue Mion, PLLC

(57) ABSTRACT

A liquid crystal display is provided. The liquid crystal display includes a liquid crystal panel, a light guide plate disposed below the liquid crystal panel, and a light source unit which emits light to at least one side surface of the light guide plate. The light source unit includes light source elements which are disposed adjacent to the at least one side surface of the light guide plate, and which emit light that is incident on the at least one side surface of the light guide plate. A printed circuit board is disposed adjacent to a lower surface of the light guide plate and supports the light source elements.

26 Claims, 11 Drawing Sheets

BACKLIGHT UNIT AND LIQUID CRYSTAL DISPLAY HAVING THE SAME

CROSS-REFERENCE TO RELATED APPLICATION

This application claims priority from Korean Patent Application No. 10-2010-0092592, filed on Sep. 20, 2010 in the Korean Intellectual Property Office, the disclosure of which is incorporated herein by reference.

BACKGROUND

1. Field

Apparatuses consistent with exemplary embodiments relate to a liquid crystal display in which a backlight unit has an improved configuration.

2. Description of the Related Art

A liquid crystal display is an electric device that converts and transmits electric signals, supplied from a variety of devices, into visual information using variations in the transmissivity of liquid crystals based on the application of voltage. As a representative example, there is widely used a flat panel display, which exhibits low power consumption and is convenient to carry, although it is not self-illuminating, thus requiring a separate light source.

A liquid crystal display may need a backlight unit to provide light to the liquid crystal panel, which used to form the image. The backlight unit includes a lamp serving as a light source, optical members, such as a reflecting sheet, a light guide plate, a diffusing sheet, a prism sheet, and a protective sheet, and other structural members, such as a mold frame, although the listed elements may be changed according to the size and function of the backlight unit. Other examples of a light source include a Cold Cathode Fluorescent Lamp (CCFL), an External Electrode Fluorescent Lamp (EEFL), and a Light Emitting Diode (LED).

SUMMARY

One or more embodiments provide a liquid crystal display in which a backlight unit has an improved configuration to realize a super narrow bezel design.

One or more embodiments also provide a liquid crystal display is provided in which a backlight unit has an improved configuration to improve local dimming performance.

In accordance with an aspect of an exemplary embodiment, there is provided a liquid crystal display including a liquid crystal panel, a light source unit which emits light, a light guide plate comprising a least one side surface through which receives light from the light source unit, wherein the light guide plate emits light to the liquid crystal panel, wherein the light source unit includes a plurality of light source elements which emit light and which are disposed adjacent to the at least one side surface of the light guide plate, and a printed circuit board which supports the light source units and is disposed adjacent to a lower surface of the light guide plate.

The liquid crystal display may further include a lower cover including a bottom portion which supports the light guide plate, and the printed circuit board may be disposed between the light guide plate and the bottom portion.

The liquid crystal display may further include an upper cover including a bezel portion which covers a rim of the liquid crystal panel, and an inner edge of the bezel portion may be at a position substantially corresponding to an outer edge of the light guide plate.

A width of the bezel portion may be about 3 to 10 mm.

The light guide plate may be comprise an upper surface comprising a plurality of ridges which are one of prism-shaped and lens-shaped.

The liquid crystal display may further include a prism sheet disposed between the liquid crystal panel and the light guide plate, and the prism sheet may include a plurality of prism-shaped ridges which extent in a direction which coincides with a direction in which the ridges of the light guide plate extend.

Light that is emitted from the light source elements may be emitted in a direction that substantially coincides with the direction in which the ridges of the light guide plate extend.

Light that is emitted from the light source elements may be emitted in a direction that substantially coincides with the direction in which the ridges of the prism sheet extend.

The liquid crystal display may further include a diffusing plate which is disposed above the light guide plate and which optically mixes the light incident thereon.

The liquid crystal display may further include a plurality of optical sheets stacked on the light guide plate, and the diffusing plate may be provided between a first optical sheet of the plurality of optical sheets and a second optical sheet of the plurality of optical sheets.

The printed circuit board may be made of a metal and may transfer heat, generated by the light source elements, to a bottom portion of a lower cover.

The liquid crystal display may further include a cover assembly which supports the liquid crystal panel and the light guide plate, and the cover assembly may include an upper cover and a lower cover which define an external portion of the cover assembly, and an intermediate supporting member disposed between the upper cover and the lower cover which supports the light guide plate.

The intermediate supporting member may include a body and a press portion, and the press portion may be disposed between the liquid crystal panel and the light guide plate and may protrude inward from a position corresponding to an outer edge of the light guide plate.

A width of the press portion protruding inward from the edge of the light guide plate may be about 2 to 3 mm.

The body of the intermediate supporting member may contact the light source elements and may transfer heat, generated by the light source elements, to an outer surface of the intermediate supporting member.

The liquid crystal display may further include a plurality of optical sheets disposed between the liquid crystal panel and the light guide plate.

The liquid crystal display may further include a reflecting sheet disposed below the light guide plate.

In accordance with an aspect of another embodiment, a backlight unit is provided that includes a light guide plate, a plurality of light source elements which emit light and which are arranged to face at least one side surface of the light guide plate, and a printed circuit board which supports the plurality of light source elements and which is arranged to face a lower surface of the light guide plate.

In accordance with an aspect of another exemplary embodiment, there is provided a liquid crystal display including a liquid crystal panel, a plurality of optical sheets disposed below the liquid crystal panel, a light guide plate disposed below the optical sheets, a reflecting sheet disposed below the light guide plate, a light source unit which emits light to at least one side surface of the light guide plate, and a cover assembly which supports the liquid crystal panel, optical sheets, light guide plate, reflecting sheet and light source unit, wherein the light source unit includes a plurality of light source elements disposed between a sidewall of the cover assembly and the at least one side surface of the light guide plate, wherein the plurality of light source elements emit light to the at least one side surface of the light guide plate, and a printed circuit board which supports the plurality of light source elements and which is disposed between a bottom portion of the cover assembly and a lower surface of the light guide plate.

The light guide plate may comprise an upper surface comprising a plurality of ridges which are one of prism-shaped and lens-shaped.

The optical sheets may include a prism sheet comprising a plurality of prism-shaped ridges which extend in a direction which is the same as a direction in which the ridges of the light guide plate extend.

The liquid crystal display may further include a diffusing plate disposed above the light guide plate, wherein the diffusing plate optically mixes light incident thereon.

The cover assembly may include a bezel portion which covers a rim of the liquid crystal panel, wherein an inner edge of the bezel portion may be provided at a position substantially corresponding to an outer edge of the light guide plate.

The cover assembly may include a press portion disposed between the liquid crystal panel and the optical sheets, and the press portion may protrude inward from an outer edge of the optical sheets.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
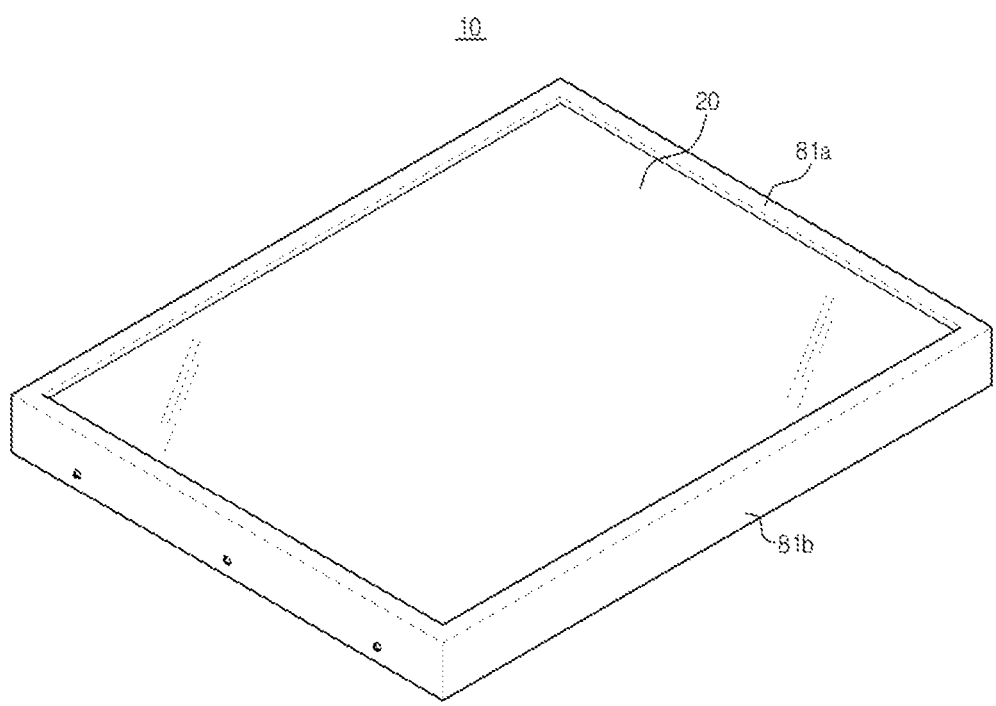
FIG. 1 is a perspective view of an assembled liquid crystal display according to an exemplary embodiment.

Reference will now be made in detail to embodiments, examples of which are illustrated in the accompanying drawings, wherein like reference numerals refer to like elements throughout.

Hereinafter, a liquid crystal display according to embodiments will be described in detail with reference to the accompanying drawings.

Figure 2:
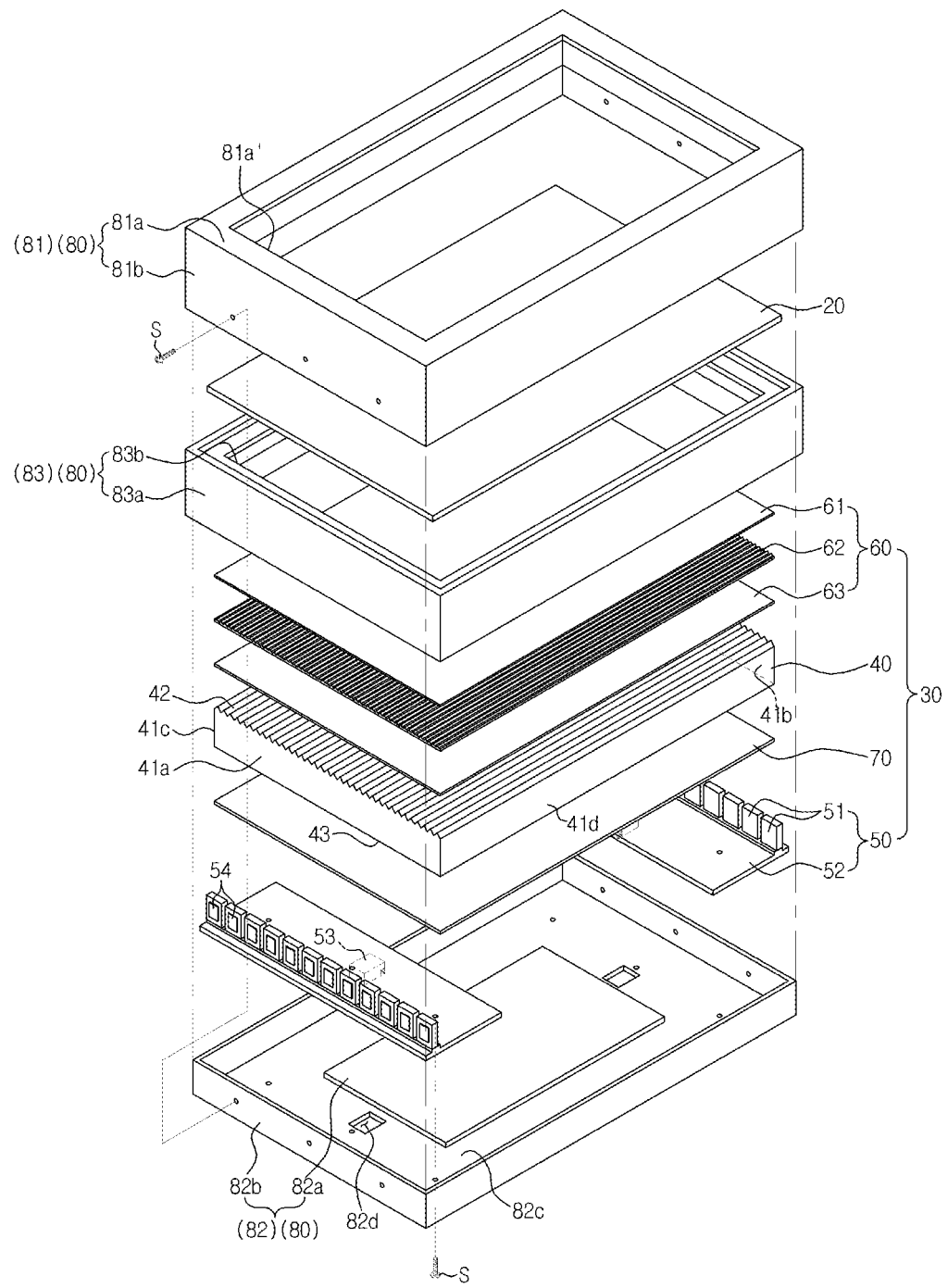
FIG. 2 is an exploded perspective view of the liquid crystal display of FIG. 1.
Figure 3:
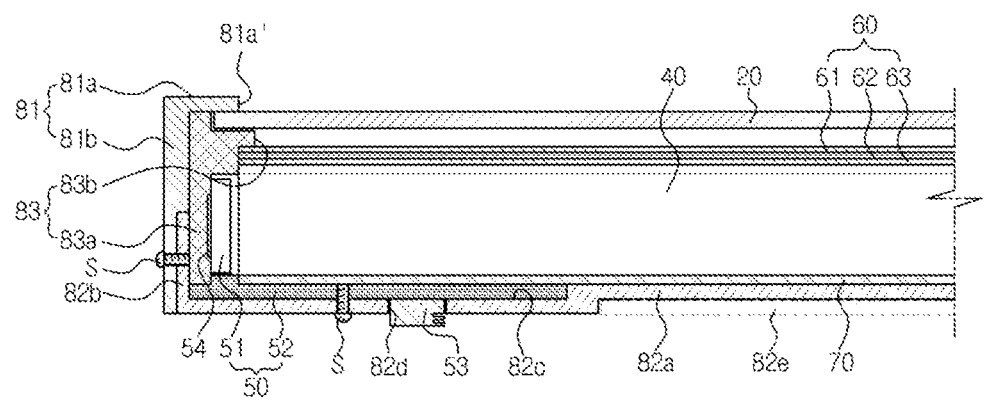
FIG. 3 is a sectional view taken along the line A-A of FIG. 1
Figure 4:
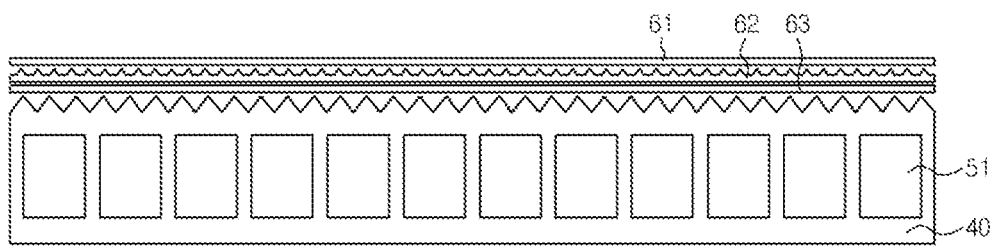
FIG. 4 is a diagrammatic view of a backlight unit including a prismatic light guide plate according to an exemplary embodiment.
Figure 5:
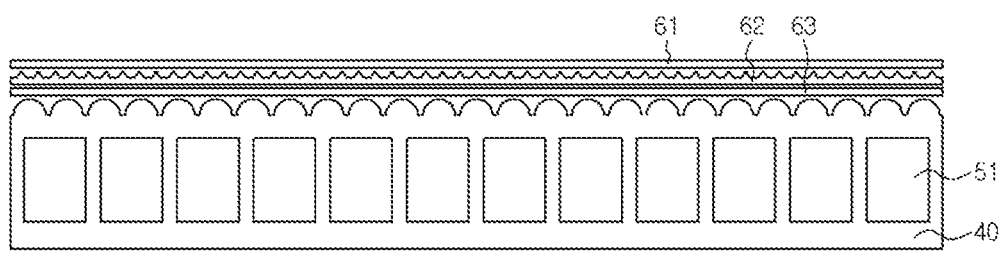
FIG. 5 is a diagrammatic view of a backlight unit including a lens light guide plate according to another exemplary embodiment.

FIG. 1 is an assembly perspective view of an assembled liquid crystal display according to an embodiment, FIG. 2 is an exploded perspective view of the liquid crystal display of FIG. 1, FIG. 3 is a sectional view taken along the line A-A of FIG. 1, FIG. 4 is a diagrammatic view of a backlight unit including a prismatic light guide plate according to an embodiment, and FIG. 5 is a diagrammatic view of a backlight unit including a lens light guide plate according to another embodiment.

As illustrated in FIGS. 1 to 5, the liquid crystal display 10 may include a liquid crystal panel 20, a backlight unit 30, and a cover assembly 80 surrounding the aforementioned components.

The liquid crystal panel 20 may function as a display unit of the liquid crystal display 10. According to a related art configuration of the liquid crystal panel 20, liquid crystals are charged in a narrow gap between two thin glass substrates and voltage is applied to the liquid crystals via a transparent electrode to change the alignment direction of liquid crystal molecules so as to selectively transmit or reflect light, thereby enabling the formation of an image.

The backlight unit 30 may be disposed below the liquid crystal panel 20 to provide the liquid crystal panel 20 with light. The backlight unit 30 may include a light guide plate 40, a light source unit 50, optical sheets 60, and a reflecting sheet 70.

The light guide plate 40 may be made of acryl-based resin, and may have an approximately hexahedral shape.

The light guide plate 40 may be provided with various patterns at a lower surface 43 thereof. The patterns of the light guide plate 40 serve to disturb the total internal reflection of light introduced into the light guide plate 40, thus assuring a more uniform emission of the light from an upper surface 42 of the light guide plate 40. The light emitted from the upper surface 42 of the light guide plate 40 may define a surface light source.

The upper surface 42 of the light guide plate 40 may be provided with ridgelines in the form of prisms or lenses. The prism-shaped or lens-shaped ridgelines may extend lengthwise in a horizontal direction or a vertical direction of the light guide plate 40. More specifically, the prism-shaped or lens-shaped ridgelines may be formed at the upper surface 42 of the light guide plate 40 so as to extend lengthwise in a horizontal direction of the light guide plate 40 in a case in which light is introduced into the light guide plate 40 through one or both of the left and right side surfaces 41a and 41b, or so as to extend lengthwise in a vertical direction of the light guide plate in a case in which light is introduced into the light guide plate through one or both of the upper and lower side surfaces 41c and 41d of the light guide plate 40. FIG. 2 illustrates the prism-shaped or lens-shaped ridgelines extending in the horizontal direction of the light guide plate 40.

The light source unit 50 may supply light to one or more of the side surfaces 41a, 41b, 41c and 41d of the light guide plate 40. The light source unit 50 may include light source elements 51 which emit light and a printed circuit board 52 that supports the light source elements 51.

The light source elements 51 may be arranged close to at least one of the side surfaces 41a to 41d of the light guide plate 40. Specifically, the light source elements 51 may be arranged to face at least one of the side surfaces 41a to 41d of the light guide plate 40, so as to directly introduce light into the light guide plate 40 through the at least one side surface.

Each of the light source elements 51 may include a light emitting diode (LED) emitting red, green, or blue light. The light source elements 51 may constitute a plurality of blocks, each of which includes a combination of LEDs emitting red, green and blue light. The light source elements 51 divided into the plurality of blocks may be controlled to enable local dimming or partial image control technologies.

The light source elements 51 may be fixed to the printed circuit board 52 via brazing.

The printed circuit board 52 may be disposed close to the lower surface 43 of the light guide plate 40. More specifically, the printed circuit board 52 may be disposed between the light guide plate 40 and a lower cover 82. The printed circuit board 52 may be made of plastics or metals. In particular, if the printed circuit board 52 is made of a metal, such as aluminum, it may be possible to enhance the thermal conductivity of the printed circuit board 52. In this case, the metallic printed circuit board 52 may act to rapidly transfer heat, generated by the light source elements 51, to the lower cover 82 for dissipation of the heat to outside air.

The printed circuit board 52 may include patterned wires connected to respective electrodes of the light source elements 51. The patterned wires of the printed circuit board 52 may serve to transmit drive signals to the light source elements 51. The printed circuit board 52 may also include a connector 53 connected to a main board (or a power board) 82e. The connector 53 may be located at an upper surface, or a lower surface of the printed circuit board 52. In the drawing, the connector 53 is illustrated as being located at the lower surface of the printed circuit board 52.

The optical sheets 60 may include a protective sheet 61, a prism sheet 62, and a diffusing sheet 63.

The protective sheet 61 may be provided on the prism sheet 62, and may serve to protect the prism sheet 62 that is sensitive to dust, scratches, and other irritants.

The prism sheet 62 may be provided on the diffusing sheet 63 and may condense the light, diffused by the diffusing sheet 63, in a direction perpendicular to a plane of the liquid crystal panel 20.

An upper surface of the prism sheet 62 may be provided with prism-shaped ridgelines. The prism-shaped ridgelines may extend lengthwise in a horizontal, or vertical direction of the prism sheet 62. Here, the direction in which the prism-shaped ridgelines of the prism sheet 62 extend may conform to that of the prism-shaped or lens-shaped ridgelines of the light guide plate 40.

The diffusing sheet 63 may be provided on the light guide plate 40. The diffusing sheet 63 may include a bead-shaped coating layer to diffuse the light emitted from the upper surface 42 of the light guide plate 40 and supply the light to the liquid crystal panel 20.

In addition, the reflecting sheet 70 may be provided below the light guide plate 40. The reflecting sheet 70 serves reflects the totally reflected downward light from the light guide plate 40 so as to direct the light to the light guide plate 40.

The cover assembly 80 may include an upper cover 81, the lower cover 82, and an intermediate supporting member 83.

The upper cover 81 may include a bezel portion 81a and an upper sidewall 81b, and the lower cover 82 may include a bottom portion 82a and a lower sidewall 82b.

The bezel portion 81a of the upper cover 81 may extend along the rim of the liquid crystal panel 20. An end 81a' of the bezel portion 81a may be positioned to substantially correspond to an edge of the light guide plate 40 or of the optical sheets 60. This may maximize an available imaging area of the liquid crystal panel 20 and may reduce a width of the bezel portion 81a to a range of 3-10 mm, resulting in a super narrow bezel design.

The bottom portion 82a of the lower cover 82 may support the reflecting sheet 70, the light guide plate 40, and the optical sheets 60. The lower cover 82 may further include a substrate receiving portion 82c in which the printed circuit board 52 may be disposed. The substrate receiving portion 82c may be indented with respect to the surrounding portion thereof. Once the printed circuit board 52 is disposed in the substrate receiving portion 82c, the printed circuit board 52 may be fixed to the bottom portion 82a via fastening of screws S.

The substrate receiving portion 82c of the bottom portion 82a may have a through-hole 82d such that the connector 53 of the printed circuit board 52 may be inserted therethrough so as to be exposed outside the lower cover. The connector 53 of the printed circuit board 52 may be connected to the main board 82e.

The upper sidewall 81b and the lower sidewall 82b may be fastened to each other using screws S. In this way, the upper cover 81 and the lower cover 82 may be integrated.

The intermediate supporting member 83 may include a body 83a and a press portion 83b.

The body 83a may be vertically oriented such that the top thereof may contact the bezel portion 81a of the upper cover 81 and the bottom thereof may be supported by the bottom portion 82a of the lower cover 82.

The body 83a may be made of plastics or metals. In particular, if the body 83a is made of metals, the body 83a may easily transfer heat generated by the light source elements 51 to the outside. In this case, a radiating plate 54 may be provided at the back of the light source elements 51 to assure easy heat transfer from the light source elements 51 to the body 83a.

The press portion 83b may be disposed between the liquid crystal panel 20 and the optical sheets 60 so as to provide a predetermined gap between the liquid crystal panel 20 and the optical sheets 60.

The press portion 83b may support the liquid crystal panel 20 from the lower side thereof, and also, may press the optical sheets 60 downward from the upper side thereof. Thus, the press portion 83b may firmly fix the optical sheets 60, the light guide plate 40, and the reflecting sheet 70 to the bottom portion 82a.

The press portion 83b may protrude inward from the body 83a by a width suitable for pressing the optical sheets 60 downward. Conventionally, a protruding width of the press portion 83b may be in a range of about 2-3 mm. Limiting the protruding width of the press portion 83b as much as possible enables a super narrow bezel design because by reducing the protruding width of the press portion 83b of the intermediate supporting member 83, a thickness of the bezel portion 81a of the upper cover 81 may also be reduced.

In an alternative embodiment, although not illustrated, the press portion 83b may be disposed between the light guide plate 40 and the optical sheets 60 and may serve to press the light guide plate 40 downward and firmly fix the light guide plate 40 and the reflecting sheet 70 to the bottom portion 82a. Similarly, the press portion 83b may protrude from the body 83a by a width suitable for pressing the light guide plate 40 downward. Conventionally, a protruding width of the press portion 83b may be in a range of about 2-3 mm.

Hereinafter, operations and effects of the liquid crystal display according to the above described embodiments will be described in detail.

Figure 6:
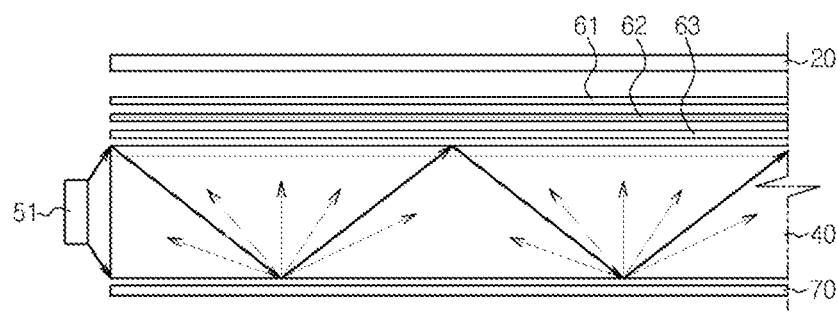
FIG. 6 is a diagrammatic view illustrating a light propagation path in the liquid crystal display of FIG. 1.
Figure 7:
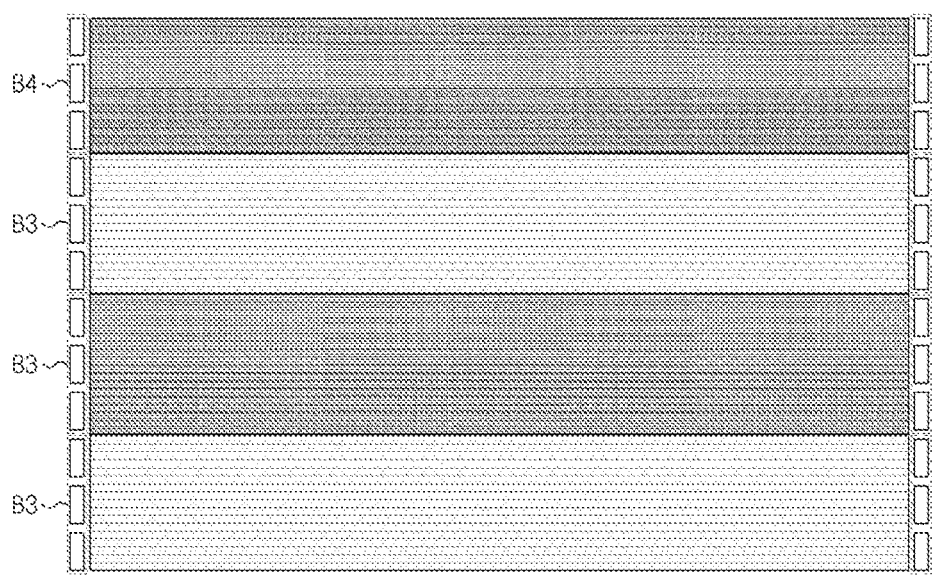
FIG. 7 is a diagrammatic view illustrating a light propagation path in the liquid crystal display of FIG. 1.

FIGS. 6 and 7 are diagrammatic views illustrating a light propagation path in the liquid crystal display according to an embodiment.

As illustrated in FIGS. 1 to 7, the backlight unit 30 may provide the liquid crystal panel 20 with light. The light source elements 51 may emit light upon receiving drive signals. The light emitted from the light source elements 51 may be introduced into the light guide plate 40 through at least one side surface 41.

The light, introduced into the light guide plate 40, may be totally internally reflected by the prism-shaped or lens-shaped ridgelines formed at the upper surface 42 of the light guide plate 40. Specifically, after the light is introduced into the light guide plate 40, the light is totally internally reflected within the light guide plate 40, thereby being transmitted along the prism-shaped or lens-shaped ridgelines to an opposite side surface 41. As the light totally reflected within the light guide plate 40 is scattered by the patterns during the above described transmission and reflection, the light is then emitted toward the liquid crystal panel 20. Thereby, the light guide plate 40 provides a surface light source.

As the patterns of the light guide plate 40 disturb the total reflection of light, the light emitted from the upper surface 42 of the light guide plate 40 is subjected to optical-mixing, re-reflection, etc. while passing through the optical sheets 60, thereby providing a backlight source of the liquid crystal panel 20.

In conclusion, hot spots do not occur even when the light emitted from the light source elements 51 is introduced into the light guide plate 40 through the at least one side surface 41. That is, the prism-shaped or lens-shaped ridgelines formed at the upper surface 42 of the light guide plate 40 increase optical-mixing effects, enabling an a moiré phenomenon (non-uniformity in the luminance of a display) to be limited. This effect, in particular, may be doubled if the direction of the prism-shaped or lens-shaped ridgelines of the light guide plate 40 coincides with that of the prism-shaped ridgelines of the prism sheet 62.

The light source elements 51 may be divided into a plurality of blocks and each of the blocks may be individually controlled. For example, a first block B1 and a third block B3 may be turned on, and a second block B2 and a fourth block B4 may be turned off. In this case, light emitted from the first block B1 and the third block B3 may be reflected along the prism-shaped or lens-shaped ridgelines of the light guide plate 40 provided at positions corresponding to the first and third blocks B1 and B3 without moving to a peripheral region corresponding to the second and fourth blocks B2 and B4.

In conclusion, it may be possible to prevent the light emitted from the respective blocks B1 to B4 from illuminating the peripheral region, and consequently, it may be possible to effectively provide for local dimming. This effect, in particularly, may be doubled if the direction of the prism-shaped or lens-shaped ridgelines of the light guide plate 40 coincides with that of the prism-shaped ridgelines of the prism sheet 62.

Figure 8:
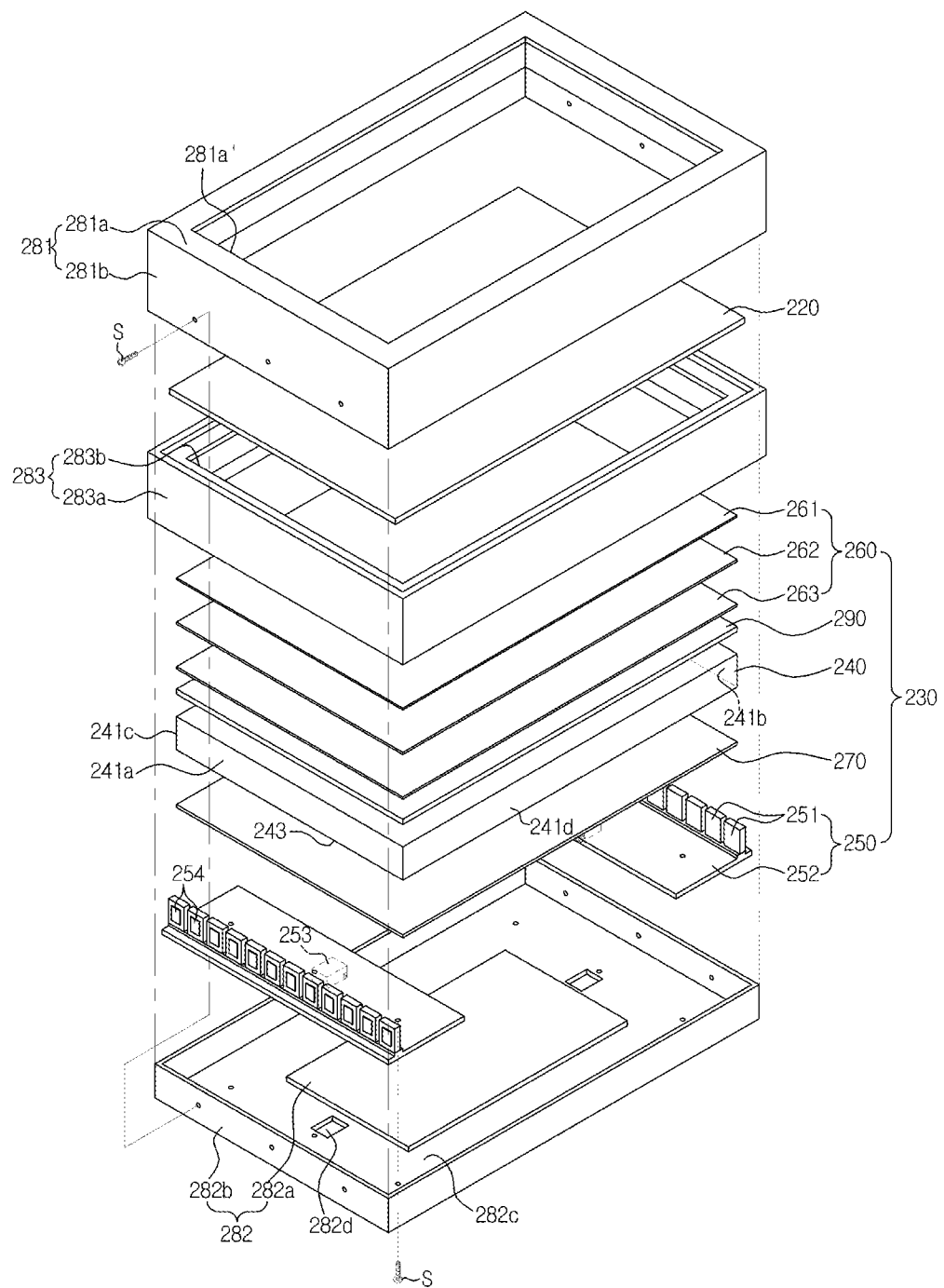
FIG. 8 is an exploded perspective view of a liquid crystal display according to another embodiment.
Figure 9:
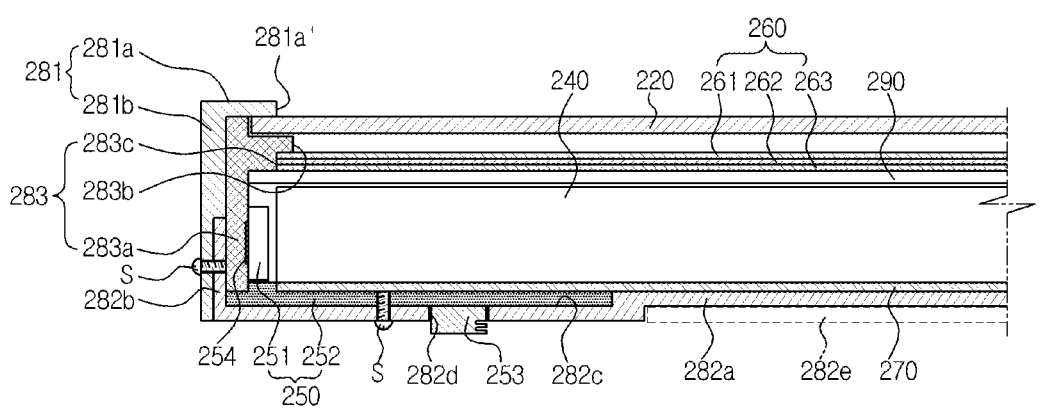
FIG. 9 is a sectional view of the liquid crystal display of FIG. 8.

FIG. 8 is an exploded perspective view of a liquid crystal display according to another embodiment, and FIG. 9 is a sectional view of the liquid crystal display of FIG. 8.

As illustrated in FIGS. 8 and 9, a liquid crystal display 210 may include a liquid crystal panel 220, a backlight unit 230, and a cover assembly 280 surrounding the aforementioned components. Hereinafter, a description of the same configuration as the liquid crystal display 10 illustrated in FIGS. 1 to 7 will be omitted, and only a different configuration of the liquid crystal display 210 will be described in detail.

The liquid crystal panel 220 may function as a display unit of the liquid crystal display 210.

The backlight unit 230 may include a light guide plate 240, a light source unit 250, optical sheets 260, a reflecting sheet 270, and a diffusing plate 290.

The light guide plate 240 may be made of acryl-based resin, and may have an approximately hexahedral shape.

The light guide plate 240 may be provided at a lower surface 243 thereof with various patterns. The patterns of the light guide plate 240 disturb the total internal reflection of light introduced into the light guide plate 240, thus providing uniform emission of the light from an upper surface 242 of the light guide plate 240. The light is emitted from the upper surface 242 of the light guide plate 240, such that the light guide plate 240 defines a surface light source.

According to the present embodiment, the upper surface 242 of the light guide plate 240 has no prism-shaped or lens-shaped ridgelines. The upper surface 242 of the light guide plate 240 may be a smooth surface. In the present embodiment, a diffusing plate 290 may be provided above the light guide plate 240.

The diffusing plate 290 may be disposed between the light guide plate 240 and the optical sheets 260. The diffusing plate 290 may cause mixing of light that is not introduced into the light guide plate 240. A thickness of the diffusing plate 290 may be freely selected according to the level of moiré (non-uniformity in the luminance of a display). For example, a thick diffusing plate may be used if a moiré problem is serious, and a thin diffusing plate may be used if there is little problem with moiré.

The light source unit 250 may supply light to one or more of the side surfaces 241a, 241b, 241c and 241d of the light guide plate 240. The light source unit 250 may include light source elements 251 which emit light, and a printed circuit board 252 that supports the light source elements 251.

The light source elements 251 may be arranged close to at least one side surface 241 of the light guide plate 240. Specifically, the light source elements 251 may be arranged to face one or more of the side surfaces 241a to 241d, so as to directly introduce light into the light guide plate 240 via the one or more side surfaces.

The printed circuit board 252 may be disposed close to the lower surface 243 of the light guide plate 240, and more specifically, may be disposed between the light guide plate 240 and a lower cover 282. The printed circuit board 252 may be made of plastics or metals. In particular, if the printed circuit board 252 is made of a metal, such as aluminum, it may enhance thermal conductivity of the printed circuit board 52. In this case, the metallic printed circuit board 252 may rapidly transfer heat generated by the light source elements 251 to the lower cover 282 for dissipation of the heat to outside air.

The optical sheets 260 may include a protective sheet 261, a prism sheet 262, and a diffusing sheet 263.

The reflecting sheet 270 may be disposed below the light guide plate 240. The reflecting sheet 270 may serve to reflect light of the totally reflected light from a upper surface of the light guide plate 240, so as to direct the light to the light guide plate 240.

The cover assembly 280 may include an upper cover 281, a lower cover 282, and an intermediate supporting member 283.

The upper cover 281 may include a bezel portion 281a and an upper sidewall 281b. The lower cover 282 may include a bottom portion 282a and a lower sidewall 282b.

The intermediate supporting member 283 may include a body 283a and a press portion 283b.

The body 283a may be vertically oriented such that the top thereof supports the bezel portion 281a of the upper cover 281 and the bottom thereof is supported by the bottom portion 282a of the lower cover 282. In the present embodiment, the body 283a may be centrally provided with a stepped portion 283c. The stepped portion 283c may serve to support the diffusing plate 290. Specifically, the stepped portion 283c may be located at an outer edge region of the light guide plate 240 to support a portion of the diffusing plate 290 extending outward from the edge of the light guide plate 240.

In an alternative embodiment, although not illustrated, the diffusing plate 290 may be disposed between the optical sheets 260. For example, the diffusing plate 290 may be disposed between the diffusing sheet 263 and the prism sheet 262, or between the prism sheet 262 and the protective sheet 261.

The press portion 283b may be disposed between the liquid crystal panel 220 and the optical sheets 260 and may provide a predetermined gap between the liquid crystal panel 220 and the optical sheets 260.

Hereinafter, operations and effects of the liquid crystal display of the present embodiment will be described in detail.

Figure 10:
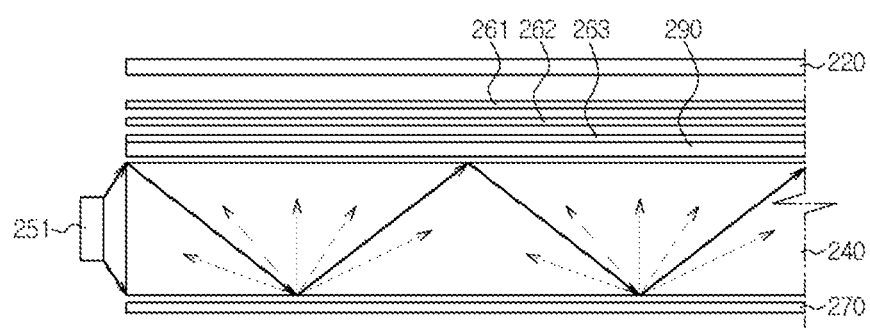
FIG. 10 is a diagrammatic view illustrating a light propagation path in the liquid crystal display of FIG. 8.
Figure 11:
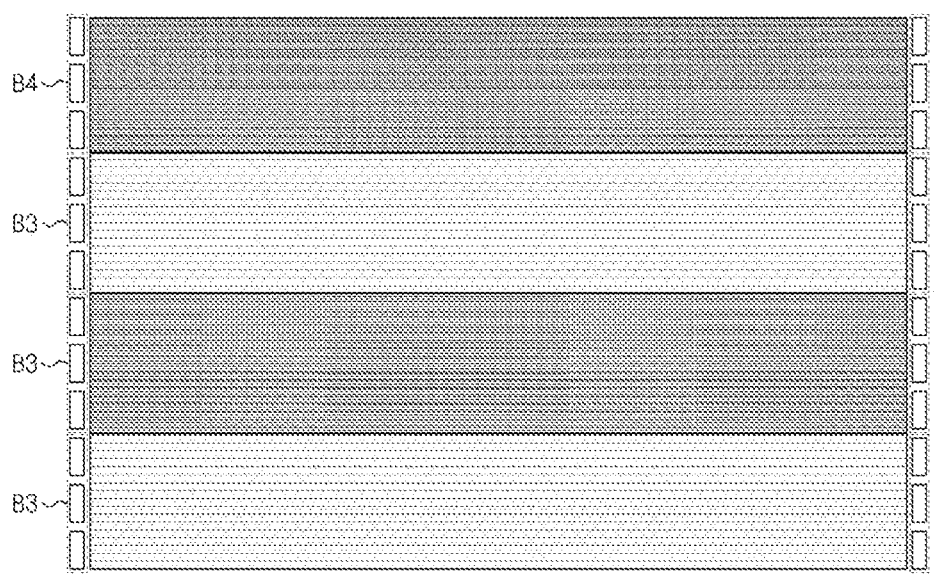
FIG. 11 is a diagrammatic view illustrating a light propagation path in the liquid crystal display of FIG. 8.

FIGS. 10 and 11 are diagrammatic views illustrating light propagation paths in the liquid crystal display according to an embodiment.

The backlight unit 230 may supply light to the liquid crystal panel 220. The light source elements 251 may emit light upon receiving drive signals. The light emitted from the light source elements 251 may be introduced into the light guide plate 240 through at least one side surface 241.

The light, introduced into the light guide plate 240 through the at least one side surfaces 241, may be transmitted to an opposite side surface via total internal reflection within the light guide plate 240. As the light is totally internally reflected within the light guide plate 240, the light is scattered by the patterns provided on the lower surface of the light guide plate 240, such that some of the light is emitted from the light guide plate 240 toward the liquid crystal panel 220. Thus, the light guide plate 240 functions as a surface light source. Also, the light, which is emitted from the upper surface 242 of the light guide plate 240 without being totally reflected within the light guide plate 240, may be optically-mixing by the diffusing plate 290.

As the patterns of the light guide plate 240 disturb the total internal reflection of light, the light emitted from the upper surface 242 of the light guide plate 240 is subjected to optical-mixing, re-reflection, etc. while passing through the optical sheets 260. Thus, the backlight source of the liquid crystal panel 220 is provided.

In conclusion, hot spots to not occur even when the light emitted from the light source elements 251 is introduced into the light guide plate 240 through at least one of the side surfaces 241a to 241d. That is, the diffusing plate 290 and the optical sheets 260 provide an optical mixing of the light, enabling a moiré phenomenon (non-uniformity in the luminance of a display) to be limited.

The light source elements 251 may be divided into a plurality of blocks and each of the blocks may be individually controlled. For example, a first block B1 and a third block B3 may be turned on, and a second block B2 and a fourth block B4 may be turned off. In this case, light emitted from the first block B1 and the third block B3 illuminate a region corresponding to the first and third blocks B1 and B3 without illuminating a peripheral region corresponding to the second and fourth blocks B2 and B4.

As a result, it may be possible to prevent light emitted from the respective blocks B1 to B4 from illuminating the peripheral region, and consequently, it may be possible to efficiently provide for local dimming.

As is apparent from the above description, a liquid crystal display according to an embodiment may be free from moiré despite having a super narrow bezel, resulting in an improvement in image quality.

Further, more efficient local dimming may be realized, resulting in an improvement in a contrast ratio, thus improving image quality.

Although a few embodiments have been shown and described, it would be appreciated by those skilled in the art that changes may be made in these embodiments without departing from the principles and spirit of the inventive concept, the scope of which is defined in the claims and their equivalents.

What is claimed is:

1. A liquid crystal display comprising:
    a liquid crystal panel;
    a light source unit which emits light; and
    a light guide plate comprising at least one side surface which receives the light from the light source unit, and transmits light to the liquid crystal panel;
    wherein the light source unit comprises:
        a plurality of light source elements which emit light and which are disposed adjacent to the at least one side surface of the light guide plate; and
        a printed circuit board which supports the light source elements and is disposed adjacent to a lower surface of the light guide plate.

2. The liquid crystal display according to claim 1, further comprising a bottom portion which supports the light guide plate,
    wherein the printed circuit board is disposed between the light guide plate and the bottom portion.

3. The liquid crystal display according to claim 2, wherein the printed circuit board is made of a metal and transfers heat, generated by the light source elements, to the bottom portion.

4. The liquid crystal display according to claim 1, further comprising a bezel portion which covers a rim of the liquid crystal panel,
    wherein an inner end of the bezel portion is provided at a position substantially corresponding to an outer edge of the light guide plate.

5. The liquid crystal display according to claim 4, wherein a width of the bezel portion is about 3 mm to about 10 mm.

6. The liquid crystal display according to claim 1, wherein the light guide plate comprises an upper surface comprising a plurality of ridges which are one of prism-shaped and lens-shaped.

7. The liquid crystal display according to claim 6, further comprising a prism sheet disposed between the liquid crystal panel and the light guide plate,
    wherein the prism sheet comprises a plurality of prism-shaped ridges which extend in a direction which is the same as a direction in which the ridges of the light guide plate extend.

8. The liquid crystal display according to claim 7, wherein the light which is emitted from the light source elements is emitted in a direction which substantially coincides with the direction in which the prism-shaped ridges of the prism sheet extend.

9. The liquid crystal display according to claim 6, wherein the light which is emitted from the light source elements is emitted in a direction which substantially coincides with a direction in which the ridges of the light guide plate extend.

10. The liquid crystal display according to claim 1, further comprising a diffusing plate which is disposed above the light guide plate and which optically mixes the light incident thereon.

11. The liquid crystal display according to claim 10, further comprising a plurality of optical sheets stacked on the light guide plate, wherein the diffusing plate is disposed between the plurality of optical sheets.

12. The liquid crystal display according to claim 1, further comprising a cover assembly which supports the liquid crystal panel and the light guide plate,
wherein the cover assembly comprises:
an upper cover and a lower cover which define an external portion of the cover assembly; and
an intermediate supporting member disposed between the upper cover and the lower cover, which supports the light guide plate.

13. The liquid crystal display according to claim 12, wherein:
the intermediate supporting member comprises a body and a press portion; and
the press portion is disposed between the liquid crystal panel and the light guide plate and protrudes inward from a position corresponding to an outer edge of the light guide plate.

14. The liquid crystal display according to claim 13, wherein a width of the press portion protruding inward from the outer edge of the light guide plate is about 2 mm to about 3 mm.

15. The liquid crystal display according to claim 13, wherein the body of the intermediate supporting member contacts the light source elements and transfers heat, generated by the light source elements, to an outer surface of the intermediate supporting member.

16. The liquid crystal display according to claim 1, further comprising a plurality of optical sheets disposed between the liquid crystal panel and the light guide plate.

17. The liquid crystal display according to claim 1, further comprising a reflecting sheet disposed below the light guide plate.

18. A backlight unit comprising:
a light guide plate;
a plurality of light source elements which emit light and which are arranged to face at least one side surface of the light guide plate; and
a printed circuit board which supports the plurality of light source elements and which is arranged to face a lower surface of the light guide plate.

19. A liquid crystal display comprising:
a liquid crystal panel;
a plurality of optical sheets disposed below the liquid crystal panel;
a light guide plate disposed below the optical sheets;
a reflecting sheet disposed below the light guide plate;
a light source unit which emits light to at least one side surface of the light guide plate; and
a cover assembly which supports the liquid crystal panel, optical sheets, light guide plate, reflecting sheet and light source unit,
wherein the light source unit comprises:
a plurality of light source elements disposed between a sidewall of the cover assembly and the at least one side surface of the light guide plate, wherein the plurality of light source elements emit light to the at least one side surface of the light guide plate; and
a printed circuit board which supports the plurality of light source elements and which is disposed between a bottom portion of the cover assembly and a lower surface of the light guide plate.

20. The liquid crystal display according to claim 19, wherein the light guide plate comprises an upper surface comprising a plurality of ridges which are one of prism-shaped and lens-shaped.

21. The liquid crystal display according to claim 20, wherein:
the plurality of optical sheets comprise a prism sheet comprising a plurality of prism-shaped ridges;
the ridges of the prism sheet extend in a direction which is the same as a direction of in which the ridges of the light guide plate extend.

22. The liquid crystal display according to claim 19, further comprising a diffusing plate which is disposed above the light guide plate and which optically mixes the light incident thereon.

23. The liquid crystal display according to claim 19, wherein:
the cover assembly comprises a bezel portion which covers a rim of the liquid crystal panel;
wherein an inner edge of the bezel portion is provided at a position substantially corresponding to an outer edge of the light guide plate.

24. The liquid crystal display according to claim 19, wherein:
the cover assembly comprises a press portion disposed between the liquid crystal panel and the optical sheets; and
the press portion protrudes inward from an outer edge of the optical sheets.

25. A liquid crystal display comprising:
a liquid crystal panel,
a light guide plate comprising a plurality of side surfaces, a lower surface, and an upper surface which is opposite the lower surface,
a plurality of light source elements which emit light and are disposed such that they are adjacent to and substantially parallel to at least one side surface of the light guide plate;
a printed circuit board on which the plurality of light source elements are mounted, wherein the printed circuit board is adjacent to and substantially parallel to the lower surface of the light guide plate;
wherein light incident on the at least one side surface of the light guide plate is emitted through the upper surface of the light guide plate.

26. A backlight unit comprising:
a light guide plate comprising a plurality of side surfaces, a lower surface, and an upper surface which is opposite the lower surface,
a plurality of light source elements which emit light and are disposed such that they are adjacent to and substantially parallel to at least one side surface of the light guide plate;
a printed circuit board on which the plurality of light source elements are mounted, wherein the printed circuit board is adjacent to and substantially parallel to the lower surface of the light guide plate;
wherein light incident on the at least one side surface of the light guide plate is emitted through the upper surface of the light guide plate.

* * * * *